United States Patent
Schwager

(10) Patent No.: US 12,073,535 B2
(45) Date of Patent: Aug. 27, 2024

(54) METHOD OF PROCESSING AN EDX/XRF MAP AND A CORRESPONDING IMAGE PROCESSING DEVICE

(71) Applicant: Bruker Nano GmbH, Berlin (DE)

(72) Inventor: Thomas Schwager, Berlin (DE)

(73) Assignee: BRUKER NANO GMBH, Berlin (DE)

( * ) Notice: Subject to any disclaimer, the term of this patent is extended or adjusted under 35 U.S.C. 154(b) by 350 days.

(21) Appl. No.: 17/644,558

(22) Filed: Dec. 15, 2021

(65) Prior Publication Data

US 2022/0198626 A1 Jun. 23, 2022

(30) Foreign Application Priority Data

Dec. 18, 2020 (EP) .................................... 20215631

(51) Int. Cl.
*G06T 5/20* (2006.01)
(52) U.S. Cl.
CPC ...................................... *G06T 5/20* (2013.01)
(58) Field of Classification Search
CPC .. G06T 5/20; G01N 2223/42; G01N 23/2252; G01N 23/223
See application file for complete search history.

(56) References Cited

U.S. PATENT DOCUMENTS 6,118,850 A * 9/2000 Mayo ................. G01N 23/2076
378/82
6,675,106 B1 * 1/2004 Keenan ..................... G01J 3/28
702/194
7,283,684 B1 10/2007 Keenan
(Continued)

FOREIGN PATENT DOCUMENTS

WO WO 2016/157185 A1 10/2016

OTHER PUBLICATIONS

Haaland, David M., Robert G. Easterling, and David A. Vopicka. "Multivariate least-squares methods applied to the quantitative spectral analysis of multicomponent samples." Applied Spectroscopy 39.1 (1985): 73-84. (Year: 1985).*

(Continued)

*Primary Examiner* — Andrae S Allison
(74) *Attorney, Agent, or Firm* — Lewis Roca Rothgerber Christie LLP

(57) ABSTRACT

The present invention refers to a method of processing an energy-dispersive X-ray (EDX)/X-ray fluorescence (XRF) map (1), comprising selecting a data point (dp) among a plurality of data points of the EDX/XRF map (1), wherein each of the data points comprise a local measured value (m) and a local dispersion value (v) of a measured variable; determine a first modified mean value (M[1]) based on the local measured value (m) of the selected data point (dp) and the local measured value of at least one neighboring data point neighboring the selected data point (dp) and determine a first modified dispersion value (V[1]) based on the local dispersion value (v) of the selected data point (dp) and the dispersion value of the at least one neighboring data point, when m<th, and replace the local measured value (m) of the selected data point (dp) by the first modified mean value (M[1]), when M[1]>TH[1].

15 Claims, 3 Drawing Sheets

(56) References Cited

U.S. PATENT DOCUMENTS

| | | | | |
|---|---|---|---|---|
| 7,400,772 | B1* | 7/2008 | Keenan | H04N 19/48 |
| | | | | 375/240 |
| 7,725,517 | B1* | 5/2010 | Keenan | G01N 23/223 |
| | | | | 702/23 |
| 11,652,110 | B2* | 5/2023 | Takahashi | H01L 29/78693 |
| | | | | 250/307 |
| 2019/0006146 | A1* | 1/2019 | Sakamae | H01J 37/256 |
| 2022/0221412 | A1* | 7/2022 | Goran | G01N 23/20091 |

OTHER PUBLICATIONS

Peng, Dehua, Zhipeng Gui, and Huayi Wu. "A robust and efficient boundary point detection method by measuring local direction dispersion." arXiv preprint arXiv:2312.04065 (2023). (Year: 2023).*
Extended European Search Report of 20 21 5631.1, Jul. 1, 2021, 7 pages.

* cited by examiner

METHOD OF PROCESSING AN EDX/XRF MAP AND A CORRESPONDING IMAGE PROCESSING DEVICE

CROSS-REFERENCE TO RELATED APPLICATION

The present application claims priority to European Patent Application Number 20215631.1, filed Dec. 18, 2020. The entire content of which is incorporated herein by reference.

FIELD OF THE INVENTION

The present invention relates to a method of processing an EDX/XRF map and an image processing device comprising a processor configured to perform the method. Further, an apparatus for generating an EDX/XRF map with an image processing device is provided.

TECHNOLOGICAL BACKGROUND

An energy-dispersive X-ray, EDX, map or an X-ray fluorescence, XRF, map can show spatially resolved data points of a sample which can show the distribution of elements. An X-ray-spectrometer (XRS) for element analysis, e.g. an energy-dispersive X-ray spectrometer (EDX), are commonly used for generating said maps and used in particular in the field of imaging element distributions.

When spectra of a sample are recorded with low measuring times, the received intensity, i.e. the number of photons, may be low, too. The recorded data then may have a low signal-to-noise ratio, in particular the amplitude of the noise may become comparable or even higher than the amplitude of the measured variable. Details in the EDX/XRF map are then shown which do not exist in reality and are thus pure artefacts. These artefacts would disappear when the measuring time would be sufficiently long.

In consequence, the EDX/XRF map, i.e. for example the element map, may lack optical quality and the desired measurement task may not be fulfilled. In particular cases, elements with similar spectral profiles, e.g. Si—K and W-M spectra, at a similar position may not be sufficiently separated from one another.

According to the state of the art, empirical EDX/XRF map filters are used to improve the optical quality of the EDX/XRF map. These filters, however, have the disadvantage that they only apply to the complete EDX/XRF map and the complete scan image. Local differences in the measurement tasks may occur due to more complicated regions of the sample. Thus, local differences remain unconsidered when treating every data point in the same manner with the same filter function.

It is thus an object of the present invention to overcome or reduce at least some of the drawbacks of the prior art and to provide a method for image processing or filtering that is locally adaptive and treats locations of the EDX/XRF map according to the local difficulties present in the sample.

SUMMARY OF INVENTION

Embodiments of the present disclosure seek to solve at least one of the problems existing in the prior art to at least some extent. In particular, a method of processing a EDX/XRF map is provided, comprising the steps: select a data point among a plurality of data points of a EDX/XRF map, wherein each of the data points comprise a local measured value and a local dispersion value of a measured variable. In a further step the method comprises to compare the local measured value of the selected data point with a local threshold value, the local threshold value being based on the local dispersion value of the selected data point. In a further step a first modified mean value is determined based on the local measured value of the selected data point and the local measured value of at least one neighboring data point neighboring the selected data point and a first modified dispersion value determined based on the local dispersion value of the selected data point and the dispersion value of the at least one neighboring data point, wherein both determinations are performed when (if) the local measured value of the selected data point is below the local threshold value. Hence, these determinations may not be performed, when (if) the local measured value of the selected data point is not below the local threshold value. The method may comprise to compare the first modified mean value with a first modified threshold value based on the first modified dispersion value; and replace the local measured value of the selected data point by the first modified mean value, when the first modified mean value is above the first modified threshold value.

In other words, the method of processing an EDX/XRF map may also be referred to as a method of filtering an EDX/XRF map. An EDX/XRF map may be an image obtained by locally recording an X-ray spectrum of a sample. The EDX/XRF map may contain information of the distribution of elements of a sample and may be referred to as element map. The EDX/XRF map may be obtained by the known techniques of energy-dispersive X-ray spectroscopy, EDX, or X-ray fluorescence, XRF, respectively. A dispersion value may be in other words a scattering measure or a variability measure, i.e. the dispersion value is a measure of the noise of the measured value. A dispersion value may characterize the width of the distribution of that variable. The local measured value may be a value that is directly measured or it may be derived from a measurement. For example, the local measured value may be an intensity obtained from a peak of a measured intensity spectrum. More general, the local measured value of the EDX/XRF map may be indicative of a desired variable. The EDX/XRF map may visualize the sample in terms of its element distribution. Such an EDX/XRF map may be provided on a grid such as a regular grid in two dimensions, preferably a regular square grid. The image data may be obtained by recording the response spectra, in particular X-ray response, obtained by exciting the sample. An EDX/XRF map, e.g. an element map, may contain information of the presence, and/or relative occurrence and/or the locations of elements of the sample. When it is noted that a data point comprises a local dispersion value, it may also be understood in that the local dispersion value, or the local measured value, may be assigned to the data point. The local dispersion value may be obtained while the EDX/XRF map is generated or recorded.

The present invention has the advantage that the EDX/XRF map is selectively improved on the local scale. The idea behind the invention is that when the at least one neighboring data point is added, the modified mean value, i.e. the sum of measured values divided by the number of summands, has a lower dispersion value than the original dispersion value of that data point due to the larger amount of data points used, i.e. using larger statistics. In other words, the signal-to-noise ratio is improved. As example, when all data points are equal, a modified variance may be $V=v/N$ where N is the number of data points used. Thus, the use of further data points reduces the modified dispersion value. Therefore, the first modified threshold value based on the first dispersion value may be lower than the local threshold value, since the first modified dispersion value is reduced due to the incorporation of local measured values and variances of neighboring data points. In other words, the modified mean value, when or if above the corresponding threshold, has improved statistics thereby reducing the noise level such that noise artefacts can be substantially limited. Since the improvement is performed for a selected data point, the method controls the modification locally and accounts for locally limited measuring time or locally difficult measuring tasks that require more measuring time. The neighboring data points are used as it can be assumed that these data points may carry the most similar information compared to the selected data point. The provided method, in general, is a locally adaptive method which improves the EDX/XRF map on the local scale. In particular, separation of elements with similar spectral profiles, e.g. Si—K and W-M spectra, may be improved.

In a preferred embodiment, the first modified mean value may be an arithmetic mean of the local measured value of the selected data point and the local measured values of the at least one neighboring data points neighboring the selected data point. In other words, the modified mean value may be determined by $M=(m+\Sigma_{(i=1,\ldots,N)} m_i)/(1+N)$, wherein the sum is performed over the local measured values $m_i$ of a number N of additional data points, i.e. the at least one neighboring data points.

Preferably, the dispersion value may be a variance. In alternative and with similar information content the dispersion value may be a standard deviation. The variance is a well-defined and readily obtainable dispersion value. The modified variance may be determined by $V=(v+\Sigma_{(i=1,\ldots,N)} v_i)/(1+N)^2$, wherein the sum is as well performed over the number N of additional data points, i.e. the at least one neighboring data points.

In a preferred embodiment, the local threshold value may be defined as $th=\vartheta\ v^{1/2}$, and the first modified threshold value may be defined as $TH[1]=\vartheta\ (V[1])^{1/2}$, wherein $\vartheta>1$ is a predetermined tolerance factor. Thus, the threshold may be set to be proportional to the standard deviation. Further, thresholds are consistently set with each other. The predetermined tolerance factor may allow to define how far away the measured value or mean value should be from the noise defined by the standard deviation. For example the factor may be $\vartheta=2, 3, 4$, but the invention is not restricted thereto. The predetermined tolerance factor may allow to define the desired accuracy requirements of the data points of the spectral image.

Preferably, the at least one neighboring data point may comprise the neighboring data points located in a closest shell around the selected data point. The selection of these neighbors can be done sufficiently fast, e.g. for a square grid, and the noise becomes rapidly suppressed when using all closest shell neighbors and the additional data points are symmetric around the selected data point. A shell may be defined according to an underlying grid, i.e. the grid geometry, of the EDX/XRF map. For example, in a square grid the shell is a square shell and in a rectangular grid it is a rectangular shell.

In a preferred embodiment, the at least one neighboring data point may comprise the neighboring data points with the shortest distance to the selected data point.

Preferably, the method may comprise the step of keeping the local measured value of the selected data point unchanged, when the local measured value of the selected data point is above the local threshold value. Here, the method has the benefit that a data point is not modified when this is not required. In certain local areas of the map the accuracy or statistical reliability may be sufficient and a modification not needed. Thus, the adaptive method for these points does not change the measured value in such case. The method is therefore selective to the local environment in the image and the local differences in the measuring task.

In a preferred embodiment, the method may comprise to determine an n-th modified mean value with $n \geq 2$ based on the local measured values used for determining the $(n-1)$-th modified mean value and the local measured values of additional data points, and determine an n-th modified dispersion value with $n \geq 2$ based on the local dispersion values for determining the $(n-1)$-th modified dispersion value and the local dispersion values of the additional data points, both when the $(n-1)$-th modified mean value of the selected data point is below the $(n-1)$-th modified threshold value. Thereby a successive repetition of determining modified mean values is provided as long as the required criterion of precision is not fulfilled. In other brief words, the method comprises to successively determine modified mean values, modified dispersion values and threshold values which have successively improved precision.

Preferably, the method may further comprise to compare the n-th modified mean value with an n-th modified threshold value being smaller than the $(n-1)$-th modified threshold value and based on the n-th modified dispersion value. In a further step, the method may comprise to replace the local measured value of the selected data point by the n-th modified mean value, when the n-th modified mean value is above the n-th modified threshold value. Thus, the method comprises to successively determine modified mean values, modified dispersion values and threshold values until an n-th modified mean value $M[n]$ is above the n-th modified threshold value $TH[n]$, i.e. $M[n]>TH[n]$. Then, the local measured value of the selected data point is replaced by the n-th modified mean value. Here, n may represent an iteration index and may be a natural number. Thereby, the method allows to systematically suppress the noise level by incorporating more and more data points. This guarantees to reach a modified mean value with sufficient signal-to-noise ratio, which eventually fulfills the required precision.

Preferably, the additional data points used may be data points located in an n-th-closest shell around the selected data point; or the additional data points used may be data points with the n-th-shortest distance to the selected data point. Thereby a well-defined iteration scheme is provided to systematically use more and more neighboring data points to reach a statistical valid mean value.

In a preferred embodiment, the n-th modified threshold value may be defined as $TH[n]=\vartheta\ (V[n])^{1/2}$, wherein the dispersion value $(V[n])$ is a variance and $\vartheta \geq 1$ is the predetermined tolerance factor. Thus, the threshold is decreased from step to step in the same consistent manner due to the variance suppression.

In a preferred embodiment, the method may comprise to perform the method for each data point of the plurality of data points of the EDX/XRF map. Thus, the entire EDX/XRF map can be processed/filtered providing a local decision and adaption scheme for each individual data point. Thus, each data point is treated individually and separately. Each data point is modified when it is determined to be necessary.

In a further aspect of the invention, a computer program comprising instructions which, when the program is executed by a computer, cause the computer to carry out the method as disclosed in the present invention.

In a further aspect of the invention, an image processing device may comprise a processor configured to perform the method as disclosed in the present invention. The same advantages as above apply to the device.

In a further aspect of the invention, an apparatus for generating an EDX/XRF map of a sample with an image processing device according the invention is disclosed. The apparatus may be a spectroscopic apparatus. The image processing device may be an internal unit of the apparatus or connected thereto. The same advantages as above apply. In a further aspect, a measurement system with such apparatus and an image processing device, separated or integrated in the apparatus, is provided.

Further aspects of the present invention could be learned from the following description.

The electronic or electric devices and/or any other relevant devices or components according to embodiments of the present invention described herein may be implemented utilizing any suitable hardware, firmware, or an application-specific integrated circuit, software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

BRIEF DESCRIPTION OF THE DRAWINGS

Features will become apparent to those of ordinary skill in the art by describing in detail exemplary embodiments with reference to the attached drawings in which.

DETAILED DESCRIPTION OF THE INVENTION

Figure 1:
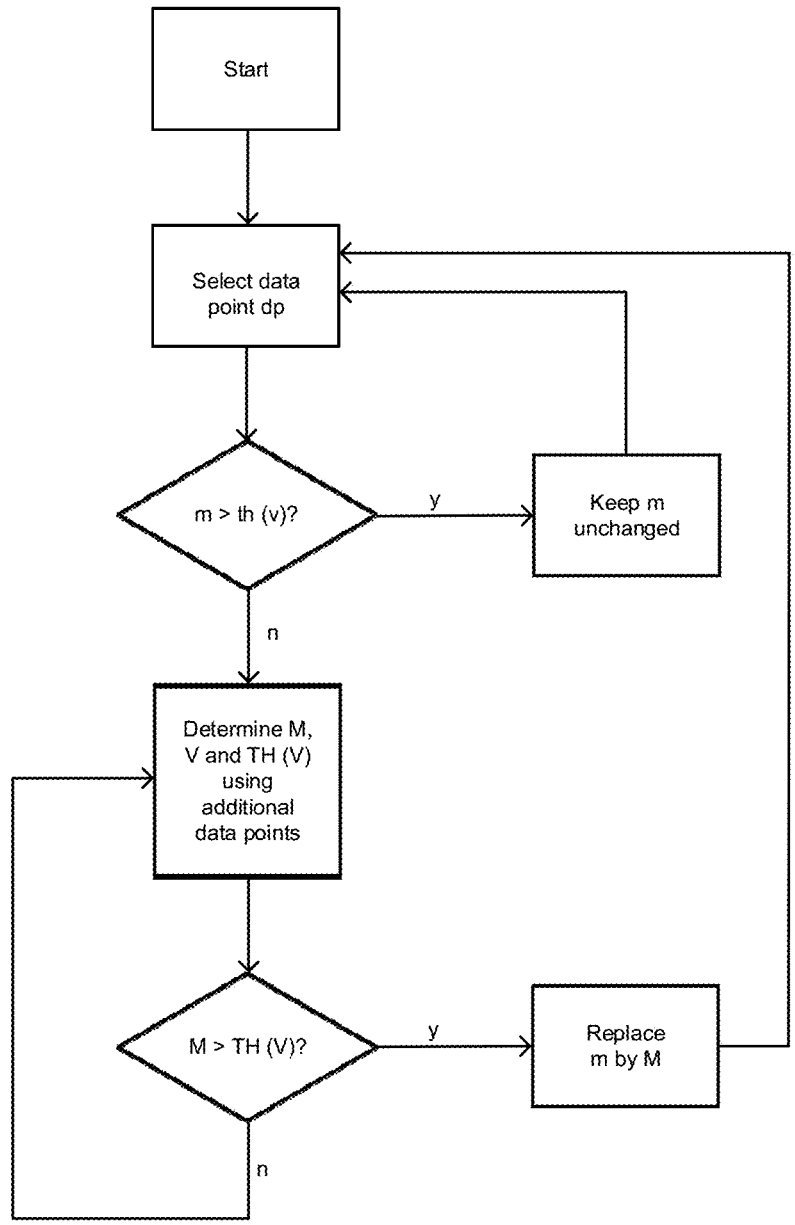
FIG. 1 illustrates as a flow diagram the method of processing an EDX/XRF map according to an embodiment of the invention.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

Figure 5:
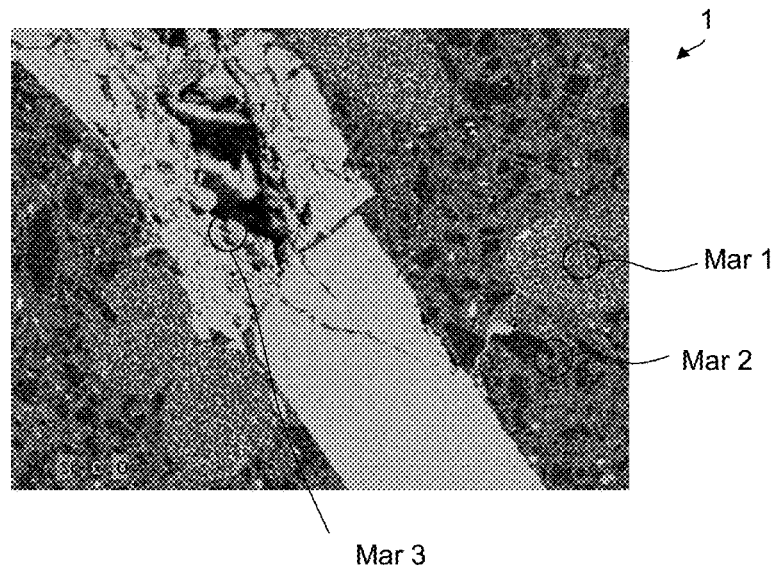
FIG. 5 illustrates an exemplary EDX map in an initial state before processing.

FIG. 1 illustrates a method of processing an EDX/XRF map 1 according to an embodiment of the invention which will be described in the following in more detail. Starting point for this method is the provision of an EDX/XRF map 1. FIG. 5 shows an example of such an EDX/XRF map 1 in an initial state before processing and will be described later below.

The EDX/XRF map 1 comprises a plurality of spatially resolved data points. These data points may be arranged on a grid, preferably a regular square grid but the invention is not restricted thereto. The plurality of data points form the EDX/XRF map 1. Preferably, the EDX/XRF map may be referred to as element map. It may be, in other words, a map obtained by locally recording X-ray spectra, e.g. an X-ray response, of a sample. Such a map 1 may show the distribution of chemical elements of a sample. The measuring techniques according to EDX or XRF are common place techniques and a detailed description is omitted for the sake of conciseness.

A local measured value m and local dispersion value v are assigned to each of the data points. Local means here that for each data point the measured value m and/or the dispersion value v may be different from those of other data points, that is they are each a function of the position or grid point of the EDX/XRF map 1. The measured value m and the dispersion value v may be determined in the process of measuring a sample.

The variable measured from a sample may be for example a light intensity, e.g. an X-ray intensity, emitted by elements of the sample, but the invention is not restricted thereto. The local dispersion value v, in other words a variability measure or scattering measure, may be a parameter which quantifies the noise, i.e. the lack of precision of the measured quantity at the specific location. Preferably, the dispersion value v may be a variance. The local measured value m of the EDX/XRF map 1 may be indicative of the measured variable. For example, it may be a value that is directly measured or it may be indirectly derived from a measurement, for example as a peak intensity of a measured spectrum at a data point, i.e. at a position on the sample.

After start, see FIG. 1, the method comprises a step of selecting a data point dp among the plurality of data points of the EDX/XRF map 1. In an embodiment, the selection may be a random selection. In other embodiments, a selection may be performed that allows to systematically select further data points along grid lines of the EDX/XRF map 1.

In a consecutive step, the local measured value m of the selected data point dp is compared with a local threshold value th. The local threshold value th is not a constant but is based on the local dispersion value v of the selected data point dp. Preferably, the threshold th may be defined as a multiple of the local standard deviation of the selected data point dp, that is th=$\vartheta$ $v^{1/2}$ with $\vartheta \geq 1$ being a predetermined tolerance factor and v the variance. This test probes in other words directly whether the local measured value m is sufficiently above the noise level, the noise level characterized by the standard deviation. The local threshold value th thus defines a criterion, i.e. a local criterion, to discriminate whether the data point dp has sufficient precision or does not have sufficient precision. Since the local threshold value th is based on the local dispersion value v, the local threshold value th may increase with increasing local dispersion value v, see the formula above as preferred example.

A lack of precision of the local measured value m may be the result of a too short measuring time and/or a location with a difficult measuring task, e.g. elements with spectral profiles both similar to the measured spectra as described above or difficult geometries of a sample.

When the local measured value m of the selected data point dp is above the local threshold value th, i.e. m>th(v), the selected data point dp may have sufficient precision. In such a case, no modification needs to be performed and the local measured value m of the selected data point dp is kept unchanged, see FIG. 1. Then, another data point may be selected to re-start the method. This has the advantage that an unneeded modification can be prevented locally, i.e. decided for each data point dp individually.

When it is determined that the local measured value m of the selected data point dp is below the local threshold value th, a first modified mean value M[1] is determined based on the local value m of the selected data point dp and the local measured values of at least one neighboring data point neighboring the selected data point dp, see FIG. 1.

The label M used in FIG. 1, and similar for TH and V, may abbreviate successively modified mean values M[1], . . . , M[n] as described also further below. In other words, M (or TH and V) may represent one of the M[1], . . . , M[n] depending on the number n of determinations required for the selected data point.

According to an arithmetical mean, the modified mean value M[1] may be determined based on the formula M=(m+$\Sigma_{(i=1,\ldots,N)} m_i$)/[1+N]), wherein the sum $\Sigma$ is performed over the local measured values $m_i$ of a number N of additional data points, i.e. in this case by the at least one neighboring data point.

Figures 2, 3, 4:
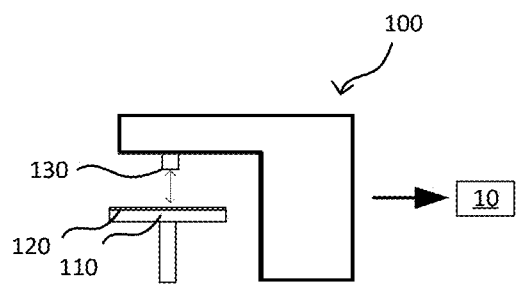
FIG. 2 illustrates a selection scheme of additional data points according to a first embodiment of the invention.
FIG. 3 illustrates a selection scheme of additional data points according to a second embodiment of the invention.
FIG. 4 illustrates a schematic apparatus for generating an EDX/XRF map according to an embodiment of the invention.

In a preferred and advantageous example, the at least one neighboring data points may be the neighboring data points located in a closest shell around the selected data point dp. Such selection of neighboring data points is illustrated in FIG. 2, the neighboring data points indicated with 'a'. In the example of a square or rectangular grid, the selected data point dp has N=8 nearest neighbor data points, i.e. the local measured value of 8 data points would be added to the local measured value m of the selected data point dp to determine the first modified mean value M[1], i.e. for example to the sum as defined above.

In an alternative example as depicted in FIG. 3 the at least one neighboring data points comprises the neighboring data points with the shortest distance to the selected data point dp, see again the data points indicated with 'a'. In the example of a square grid as shown in FIG. 3, the selected data point dp has N=4 closest neighbor data points, i.e. the local measured values of these 4 data points would be added to the local measured value m of the selected data point dp to determine the first modified mean value M[1].

Further, the first modified dispersion value V[1] may be determined based on the local dispersion value v of the selected data point dp and the dispersion value of the at least one neighboring data point. Preferably, the first modified dispersion value V[1] may be determined based on the formula V=(v+$\Sigma_{(i=1,\ldots,N)} v_i$)/(1+N)$^2$, wherein the sum is also performed over the number N of the additional data points, i.e. in this case the at least one neighboring data points. V and v refer here to the variance.

In a further step, the first modified mean value M[1] is compared with a first modified threshold value TH[1]. The first modified threshold value TH[1] may be based on the first modified dispersion value V[1].

Preferably, the first modified threshold value TH[1] may be defined as TH[1]=$\vartheta$ (V[1])$^{1/2}$, wherein $\vartheta$>1 is the predetermined tolerance factor. Thus, the first threshold value TH[1] may be based on the determined first modified variance value V[1] in the same manner.

In a consecutive step, see FIG. 1, the local measured value m of the selected data point dp is replaced by the first modified mean value M[1], when the first modified mean value M[1] is above the first modified threshold value TH[1], i.e. M[1]>TH[1]. That is, when the precision of the local measured value of the selected data point dp is too low, it may be replaced by the first modified mean value M[1] which has higher precision due to the involvement of the local measured values of the neighboring data points. This may be illustrated for the case of statistical equal neighboring data points, for which the first modified variance would decay to V[1]=v/N, and may be based on law of large numbers of statistics. In other words, the signal-to-noise ratio of the selected that data point dp may be increased. Since the improvement is performed for the selected data point dp, the method controls the modification locally and can account for locally limited measuring time or locally difficult measuring tasks. The provided method is thus a locally adaptive method which improve the EDX/XRF map on the local scale. For example, the hereby processed EDX/XRF map 1 may have an effective resolution which varies over the data points of the EDX/XRF map 1 due to the local adaption process.

According to FIG. 1, in case the first modified mean value M[1] is still not above the first modified threshold value TH[1]; i.e. M[1]≤TH[1], the local measured values of additional data points may be added to determine a second modified mean value M[2], see FIG. 1. Similarly, a second modified dispersion value V[2] may be determined using the local dispersion values of the additional data points. Based on the second modified dispersion value V[2], in line with the above disclosure, a second modified threshold value TH[2] may be determined.

The step of repeatedly determine updated modified values is illustrated in the schematic flow diagram of FIG. 1 by a loop. This loop can be repeated multiple times, i.e. n times, until a precision requirement for an n-th modified mean value M[n]>TH[n] may be fulfilled.

This loop may be generalized in the following. It may be determined that an (n-1)-th modified mean value M[n-1] with n>2 of the selected data point dp is below the (n-1)-th modified threshold value TH[n-1], i.e. M[n-1]<TH[n-1].

In this case, the method may comprise to determine an n-th modified mean value M[n] with n≥2 based on the local measured values used for determining the (n-1)-th modified mean value M[n-1] and the local measured values of additional data points. The above formulas may be used performing the sum also over measured values of the additional data points and N including the additional data points.

Also in this general case, the additional data points used may be data points located in an n-th closest shell around the selected data point dp=(dpx, dpy). Here and before, a shape of the shell may be defined according to the underlying grid type. For example, in the case of a square grid a shell is a square shell or in the case of a rectangular grid the shell is a rectangular shell. On a grid spanned by x and y the data points of such a shell around the selected data point may be defined by max(abs(x-dpx), abs(y-dpy))=const, where abs( ) means the absolute value of its argument. In alternative, the additional data points used may be data points with the n-th shortest distance to the selected data point dp. These selection rules are illustrated in the following FIGS. 3 and 4.

Also, the method may comprise to determine an n-th modified dispersion value V[n] with n≥2 by using the local dispersion values for determining the (n−1)-th modified dispersion value V[n−1] and the local dispersion values of the additional data points. The above disclosed formulas may be analogously used. Thereby, the modified mean value is successively improved in a systematic manner.

Again, the method may comprise the step of comparing the n-th modified mean value M[n] with an n-th modified threshold value TH[n] depending on the n-th modified dispersion value V[n].

Further, see FIG. 1, the method may comprise the step of replacing the local measured value m of the selected data point dp by the n-th modified mean value M[n], when the n-th modified mean value M[n] is above the n-th modified threshold value TH[n]. Thus, the scheme is repeated until sufficient precision is reached.

In each of the repeating steps, preferably, the n-th modified threshold value TH[n] may be defined as TH[n]=$\vartheta$ $(V[n])^{1/2}$, wherein $\vartheta \geq 1$ is the predetermined tolerance factor as introduced before and the dispersion value V[n] a variance in this case.

This method allows to systematically suppress the noise level by incorporating more and more data points to eventually reaching a modified mean value M with sufficient signal-to-noise ratio.

When the sufficient precision is reached for the n-th modified mean value M[n], the method may be performed for the remaining data points of the plurality of data points of the EDX/XRF map 1 independently. Thus, for each data point it is locally decided whether the local measured value of that data point can be kept or modified according to the present invention. The invention thus leads to a filtering/processing that is local and accounts for the local conditions of each data point.

FIGS. 2 and 3 illustrate preferred embodiments for a systematic selection of additional data points with respect to the selected data point dp to determine a modified mean value M[n] as described before.

In both cases, the underlying grid of the spectra image 1 may be the preferred regular square grid, but the invention is not restricted thereto and other grids such as hexagonal grids may be used. Here, only a small subset of a EDX/XRF map 1 may be viewed for illustration.

In FIG. 2, the first modified mean value M[1] is determined by using the data points of the neighboring first shell around the data point dp, here indicated by 'a'. The number of additional data points is in this case N=8.

The second modified mean value M[2] would be determined by also using the measured values of the data points of a second shell around the data point dp, here indicated by 'b'. In this case, the number of additional data points of the second shell would be N=16. The procedure may be continued in this manner, which allows fast determination of the data points and rapid reach of the precision limit due to the number of data points per step.

In FIG. 3, the first modified mean value M[1] is determined by using the measured values of the data points with closest distance to the data point dp, here indicated by 'c'. The number of additional data points of the first shell in this case is N=4.

The second modified mean value M[2] would be determined by using the data points of a second closest distance to the data point dp, here indicated by 'b'. In this case, the number of additional data points of the second shell would be N=4. The procedure may be continued in this manner, see e.g. the data points indicated by 'c'.

FIG. 4 shows a schematic view of an apparatus 100 for generating an EDX/XRF map 1 of a sample 120 with an image processing device 10 according to an example embodiment of the present invention. The apparatus 100 may transmit the generated EDX/XRF map 1 to the image processing device 1 as input. The image processing device 10 may be an integrated unit of the apparatus 100 or may be connected thereto for receiving the generated EDX/XRF map 1.

The apparatus 100, e.g. a spectroscopic apparatus suitable for energy-dispersive X-ray spectrometer (EDX) or X-ray fluorescence (XRF) measurements (hereinafter referred to as EDX/XRF spectrometer), may be configured to generate the EDX/XRF map 1 of a sample 120. A sample holder 110 may be provided on which the sample 120 may be positioned.

The apparatus 100 may comprise excitation means 130 to locally excite the sample 120, e.g. via an electron beam or via radiation, and means to record a spectrum, i.e. an X-ray response, from the sample 120. A detector (not shown) may be provided to locally record the outputted response from the particular elements of the sample 120. For the excitation means to use X-rays, the excitation means 130 may be in top position with respect to the sample as indicated but for example may also be inclined and/or positioned sideways with respect to the sample 120. The detector, here not shown, may be, for example, inclined and/or positioned sideways with respect to the sample 120. However, since this is only a schematic view, the invention is not restricted thereto. Typically, the sample or an excitation source is moved in order to obtain the spatially resolved data points, but the invention is not restricted thereto. Since the measuring time for each data point is finite, a data point may have limited statistical precision characterized by the dispersion value. For preparing the EDX/XRF map 1 according to the present invention each data point is assigned a local measured value m and a local dispersion value v.

The image processing device 10 may receive or generate the spatially resolving EDX/XRF map 1 based on the recorded data of the sample 120. The image processing device 10 may be an integrated part of the spectroscopic apparatus or may be separately provided but connected thereto, e.g. part of an external processor, computer etc.

The image processing device 10 may be configured to perform the method as disclosed above e.g. in the context of FIG. 1. The processed or filtered EDX/XRF map 1 with locally improved signal-to-noise ratio as disclosed above may be the output of the image processing unit 10. The apparatus 100 may share all the advantages as described above for the corresponding method.

Figure 6:
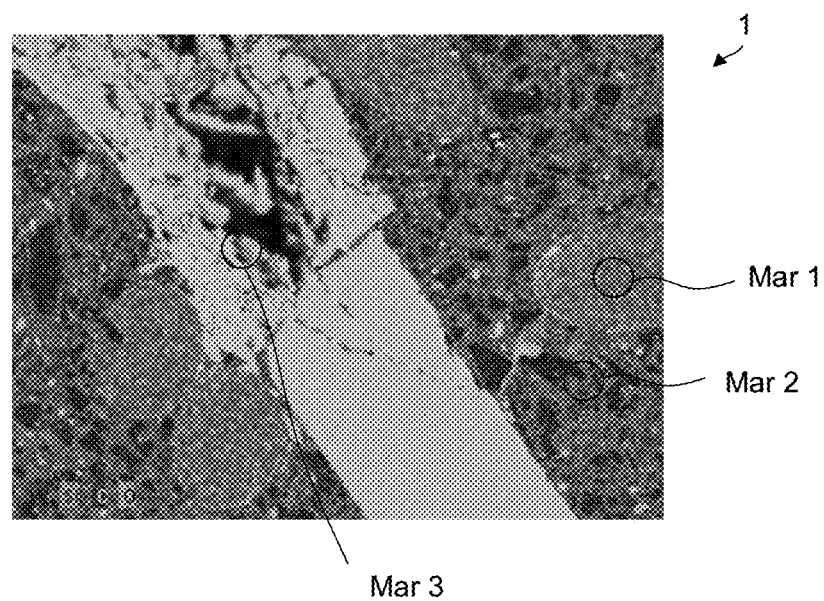
FIG. 6 illustrates an exemplary EDX map in a final state after processing.

FIGS. 5 and 6 show an EDX map 1 as example according to an initial state before filtering/processing, see FIG. 5, and a final state after processing, see FIG. 6. Equivalent images or maps may be obtained by XRF. In the EDX map 1 the elements, here as example carbon C, tungsten W, oxygen O, silicon Si may be visible on a map, but the invention is not restricted thereto.

In the following, the markings Mar1, Mar2, Mar3 are used to illustrate the effect of the local modification according to the present invention. The zone marked by Mar1 in the original state of FIG. 5 has relatively high noise level, i.e. noise may be even higher than the recorded local measured value as may be indicated by the marking Mar 1, see e.g. FIG. 6.

In these areas, the image processing method may locally replace original measured values by a modified mean values as described above.

In comparison, in the filtered EDX map 1 of FIG. 6, the noise level is substantially suppressed, which may be visualized by a homogenization effect in these areas. For other areas, e.g. highlighted by the marking Mar 3 a similar effect may have been taken place.

In difference thereto, other areas are already detailed as it may be seen for example in the marking Mar 2. When the marking Mar 2 is compared between initial and final state, i.e. FIGS. 5 and 6, this area appears similar. Thus, since in these areas the noise is low enough, the local measured value m can be kept without modification, see FIG. 1.

The two EDX/XRF maps therefore illustrate the local modification of the processing/filtering of the data points. In total, noise effects are suppressed in a local manner and not globally, i.e. locally different noise levels due to locally varying measuring tasks or measuring times are processed by the present invention which leads to an improved EDX/XRF map.

This further illustrates, that the processed EDX/XRF map 1 may have an effective resolution which varies over the data points dp of the EDX/XRF map 1 due to the local modification process.

REFERENCE SIGNS

1 EDX/XRF map
10 image processing device
100 apparatus
110 sample holder
120 sample
130 excitation means
dp selected data point
m local measured value
V local dispersion value
th local threshold value
M, M[1], . . . , M[n] modified mean value
V, V[1], . . . , V[n] modified dispersion value
TH, TH[1], . . . , TH[n] modified threshold value
Mar 1 first mark
Mar 2 second mark
Mar 3 third mark

The invention claimed is:

1. A method of processing an energy-dispersive X-ray (EDX)/X-ray fluorescence (XRF) map (1), comprising the steps:
select a data point (dp) among a plurality of data points of the EDX/XRF map (1), wherein each of the data points comprise a local measured value (m) and a local dispersion value (v) of a measured variable;
compare the local measured value (m) of the selected data point (dp) with a local threshold value (th), the local threshold value (th) based on the local dispersion value (v) of the selected data point (dp);
determine a first modified mean value (M[1]) based on the local measured value (m) of the selected data point (dp) and the local measured value of at least one neighboring data point neighboring the selected data point (dp), and
determine a first modified dispersion value (V[1]) based on the local dispersion value (v) of the selected data point (dp) and the dispersion value of the at least one neighboring data point,
both when the local measured value (m) of the selected data point (dp) is below the local threshold value (th);
compare the first modified mean value (M[1]) with a first modified threshold value (TH[1]) based on the first modified dispersion value (V[1]); and
replace the local measured value (m) of the selected data point (dp) by the first modified mean value (M[1]), when the first modified mean value (M[1]) is above the first modified threshold value (TH[1]).

2. The method of claim 1, wherein the first modified mean value (M[1]) is an arithmetic mean of the local measured value (m) of the selected data point (dp) and the local measured values of the at least one neighboring data point neighboring the selected data point (dp).

3. The method of claim 1, wherein the dispersion value (v, V[1]) is a variance.

4. The method of claim 3, wherein the local threshold value (th) is defined as th=$\vartheta$ $v^{1/2}$, and the first modified threshold value is defined as TH[1]=$\vartheta$ $(V[1])^{1/2}$, wherein $\vartheta$>1 is a predetermined tolerance factor.

5. The method of claim 1, wherein the at least one neighboring data point comprises the neighboring data points located in a closest shell around the selected data point (dp).

6. The method of claim 1, wherein the at least one neighboring data point comprises the neighboring data points with the shortest distance to the selected data point (dp).

7. The method of claim 1, wherein the method comprises the step of keeping the local measured value (m) of the selected data point (dp) unchanged, when the local measured value (m) of the selected data point (dp) is above the local threshold value (th).

8. The method of claim 1, wherein the method comprises to determine an n-th modified mean value (M[n]) with n>2 based on the local measured values used for determining the (n−1)-th modified mean value (M[n−1]) and the local measured values of additional data points, and determine an n-th modified dispersion value (V[n]) with n>2 by using the local dispersion values for determining the n−1-th modified dispersion value (V[n−1]) and the local dispersion values of the additional data points, both when the (n−1)-th modified mean value (M[n−1]) of the selected data point (dp) is below the (n−1)-th modified threshold value (TH[n−1]).

9. The method of claim 8, further comprising to compare the n-th modified mean value (M[n]) with an n-th modified threshold value (TH[n]) based on the n-th modified dispersion value (V[n]); and
replace the local measured value (m) of the selected data point (dp) by the n-th modified mean value (M[n]), when the n-th modified mean value (M[n]) is above the n-th modified threshold value (TH[n]).

10. The method of claim 8, wherein the additional data points used are data points located in an n-th closest shell around the selected data point (dp); or data points with an n-th shortest distance to the selected data point (dp).

11. The method of claim 8, wherein the n-th modified threshold value is defined as TH[n]=$\vartheta$ $(V[n])^{1/2}$, wherein the dispersion value (V[n]) is a variance and $\vartheta \geq 1$ is the predetermined tolerance factor.

12. The method of claim 1, further comprising to perform the method for each data point of the plurality of data points of the EDX/XRF map (1).

13. A non-transitory computer program comprising computer instructions which, when the computer program is executed by a computer, cause the computer to carry out the method of claim 1.

14. An image processing device (10) comprising a processor configured to perform the method of claim 1.

15. An apparatus (100) for generating an EDX/XRF map (1) of a sample (120) with an image processing device (10) according to claim 14.

* * * * *